United States Patent Office 3,117,098
Patented Jan. 7, 1964

3,117,098
PROCESS OF MAKING A UREA-FORMALDEHYDE RESIN IN THE FORM OF AN UNDRIED, CURED, THREE DIMENSIONAL RETICULATED STRUCTURE AND PRODUCT OBTAINED THEREFROM
James J. Eberl, Moylan, Sydney Coppick, Ridley Park, and Henry W. Steinmann, Broomall, Pa., assignors to Scott Paper Company, Chester, Pa., a corporation of Pennsylvania
No Drawing. Filed Apr. 6, 1960, Ser. No. 20,241
3 Claims. (Cl. 260—2.5)

The present invention relates to the preparation of foamed aminoplast resins having special application as a component of paper, paperboard and paper stocks.

Recent developments in the paper making art have involved the incorporation of synthetic resins with the cellulose fibers in the paper "furnish." Many resins have been employed in this fashion. Some have been designed to impart wet strength, flame proofing, grease resistance and comparable characteristics to the end products. Also some cured resins, in the form of discrete particles, have been employed as fillers. Further, it has been discovered that certain resins can be converted into semi-rigid foams, with physical structures exhibiting novel characteristics.

For example, in accordance with well known methods, a urea-formaldehyde prepolymer aqueous solution, formed by condensing urea in aqueous formaldehyde solution in an approximate 1 to 2 molar ratio followed by a controlled poly condensation on the acid side and an aqueous dilution is foamed by aeration in the presence of surface active agents. Into this foamed prepolymer solution there is incorporated an aqueous solution of an acid hardening catalyst whereby a stiffening or setting of the foam commences, referred to as curing or hardening. Regulation of the density of the foamed matrix by extent of aeration thereof enables control of the density of the cured resin foam within limits of from 0.2 to 0.8 pound per cubic foot. Additionally it has been noted that the degree of aeration and matrix agitation affects the fineness of the ultimate foam which can have as many as $10^5$ cells per cubic centimeter. Upon curing there results a rigidified foam which can be disintegrated and deagglomerated into structural elements of the foamed resin yielding a variable mixture of three-dimensional network structures, fractured three-dimensional networks and multi-axial fiber assemblies comprising branched rod-like segments having three-dimensional prong fragments. Melamine-formaldehyde resins, mixed melamine-urea-thiourea condensation products with formaldehyde and phenol-formaldehyde resins may be similarly processed to produce light weight foams. Other foamed resins of the urea-formaldehyde type are, for example, disclosed in U.S. Patents No. 2,273,367, 2,384,387, 2,559,891 and 2,813,780 and British Patents No. 768,562 and 773,809.

Briefly stated, the present invention contemplates the controlled curing of a thin walled foamed aminoplast resin under such conditions of temperature and humidity that there is produced a material peculiarly adapted in physical structure through formation of an open three-dimensional reticulated structure for conversion into a paper making component. While the preferred embodiment leads to a product in the moist state, this cured, moist reticulated structure may be subsequently dried under conditions of low humidity.

Curing of the resin foam is accompanied by various chemical and physical changes which have a pronounced effect upon the properties of the final product. One known physical change is the conversion of the foam into a more or less reticulated structure, possibly by a mechanism involving a rupture of cell walls and a fluid retraction thereof into the connecting strand network. Continuation of this material flow results in enlargement of the nexus or junctures of the intersecting strands. It has been discovered that curing of the resin foam when accompanied by dehydration or dessication thereof, in general reduces the flexibility of a cured reticulated structure and imparts thereto a brittleness which is most undesirable and leads to products of non-homogeneous structure, for example, formation of skin and otherwise coalesced portions. The importance of the curing conditions in the production of resin foams may be demonstrated by the following examples illustrative of our invention.

EXAMPLE I

To 324 grams of commercial formalin solution (37% formaldehyde) was added 20 grams of pyridine in a 1 liter, 3 neck flask equipped with mechanical stirrers and a condenser turned down for distillation. A mixture of 114 grams of urea and 7.6 grams of thiourea was introduced into the flask and heating of the solution initiated. There was removed from the flask by distillation over a period of about 2 hours a volume of 150 ml. of distillate consisting essentially of water admixed with some pyridine. During the reaction period, the pH of the solution was maintained between 5 and 7. The residual solution, on cooling to room temperature, was slightly cloudy, of medium viscosity and contained 69.4 percent by weight of resin solids.

Such residual solution diluted with water to contain 25% by weight resin solids was converted into a partially hardened foam according to the technique of Belgian 527,154, wherein aeration and mechanical agitation assist in material frothing. The foam was collected in mesh containers and permitted to stand at room temperature for 1 hour in order to effect a preliminary partial set. These containers of foamed resin were subsequently subjected to temperatures of 50° C. and 100° C. in forced draft ovens where different degrees of cure resulted after various periods of time, under varying conditions of relative humidity.

It is also possible to convert prepolymer solutions to partially hardened foams by the Bauer method of British 755,173, that depends wholly upon aeration to effect a foaming.

In order to evaluate the resin foams as source material for paper making stocks, samples were disintegrated or deagglomerated in admixture with a bleached sulfite wood pulp suspension of mixed western hemlock and white fur having a consistency of about 1.4% and a freeness of about 400, the mixture being diluted with water to approximately doubled volume, in a British Standard Disintegrator for 10 minutes. The disintegration of the foamed resin in admixture with the wood pulp produced a mixture of three-dimensional network structures, fractured three-dimensional structures and multi-axial fiber assemblies comprising branched rod-like segments having three-dimensional prongs with only a minor percentage of particles of a discrete particle nature. Handsheets were prepared using 500 ml. of suspension for each sheet. The sheets were dried overnight at 75° F. and 55% relative humidity and the following results were observed:

*Table I*

| Cure Time at 50° C. (hours) | Resin Solids in Structure, Percent | Bulk of Paper (cc./gm.) Percent Disintegrated Resin Structure With Wood Pulp | | | |
|---|---|---|---|---|---|
| | | 0 | 10 | 20 | 30 |
| 0 | 20.4 | 1.29 | 1.60 | 1.94 | 2.20 |
| 1 | 25.2 | 1.28 | 1.62 | 1.99 | 2.72 |
| 3 | 30.4 | 1.26 | 1.66 | 1.90 | 2.66 |
| 4 | 32.5 | 1.27 | 1.70 | 1.94 | 2.96 |
| 5 | 39.0 | 1.28 | 1.92 | 2.42 | 3.68 |
| 6 | 35.4 | 1.28 | 2.07 | 2.74 | 3.74 |
| 30 | 36.1 | 1.30 | 1.71 | 2.85 | 3.98 |
| | 97.1 | 1.29 | 1.72 | 2.02 | 2.72 |

EXAMPLE II

Further to illustrate the effect of free atmospheric circulation upon the curing of the foamed material, cellulated urea-formaldehyde resin produced as in Example I was collected in paperboard containers and subjected to a drying cycle comparable to that of Example I. The ultimate material was further processed, converted into handsheets as in Example I and the following data was recorded:

*Table II*

| Cure Time at 50° C. (hours) | Resin Solids in Structure, Percent | Bulk of Paper (cc./gm.) Percent Disintegrated Resin Structure With Wood Pulp | | | |
|---|---|---|---|---|---|
| | | 0 | 10 | 20 | 30 |
| 0 | 21.3 | 1.27 | 1.59 | 1.82 | 2.18 |
| 1 | 22.1 | 1.24 | 1.64 | 1.87 | 2.24 |
| 2 | 24.3 | 1.24 | 1.62 | 2.00 | 2.60 |
| 3 | 23.1 | 1.25 | 1.66 | 2.39 | 2.91 |
| 4 | 24.5 | 1.28 | 1.51 | 2.50 | 3.24 |
| 5 | 24.6 | 1.24 | 1.55 | 2.67 | 3.30 |
| 72 | 89.0 | 1.24 | 1.87 | 2.64 | 3.12 |

The products of Examples III and IV were prepared by the technique disclosed in Belgian 527,154.

EXAMPLE III

Curing at a temperature of 100° C. at a humidity approaching saturation produced the following results when the foamed resin of Example I was processed and incorporated into handsheets:

*Table III*

| Cure Time at 100° C. (hours) | Resin Solids in Structure, Percent | Bulk of Paper (cc./gm.) Percent Disintegrated Resin Structure With Wood Pulp | | | |
|---|---|---|---|---|---|
| | | 0 | 10 | 20 | 30 |
| 0 | 10.3 | 1.29 | 1.82 | 2.37 | 2.92 |
| 0.5 | 10.8 | 1.28 | 1.85 | 2.77 | 3.36 |
| 1.0 | 12.8 | 1.28 | 2.02 | 3.01 | 3.70 |
| 1.5 | 18.6 | 1.28 | 2.24 | 3.55 | 4.13 |
| 2.5 | 25.7 | 1.29 | 2.82 | 3.84 | 4.76 |
| 18 | 91.0 | 1.29 | 2.55 | 3.54 | 4.74 |

EXAMPLE IV

Curing at a temperature of 100° C. in a forced draft oven with recirculated air produced the following results when the foamed resin of Example I was processed and incorporated into handsheets:

*Table IV*

| Cure Time at 100° C. (hours) | Resin Solids in Structure, Percent | Bulk of Paper (cc./gm.) Percent Disintegrated Resin Structure With Wood Pulp | | | |
|---|---|---|---|---|---|
| | | 0 | 10 | 20 | 30 |
| 0 | 12.8 | 1.21 | 1.77 | 2.34 | 3.21 |
| 0.5 | 14.4 | 1.20 | 1.69 | 2.20 | 3.19 |
| 1.5 | 19.1 | 1.19 | 1.66 | 2.15 | 3.22 |
| 2.0 | 26.4 | 1.20 | 1.77 | 2.12 | 3.65 |
| 2.5 | 39.3 | 1.19 | 1.68 | 2.22 | 2.79 |
| 18 | 97.2 | 1.25 | 1.42 | 1.78 | 2.42 |

In the above examples, there is produced variable cure effects depending upon the "drying out" exposure of the product in the curing operation. For example, the meshed container in Example I secures lower percentage of humidity than in Example II where paperboard containers are employed, both in forced draft ovens. This "drying out" effect can be visualized through inspection of the percent resin solids in relation to the interval of time of 50° C. exposure. Likewise in Examples III and IV with temperatures of 100° C. under conditions of high humidity in Example III, and lower humidity in Example IV, the "drying out" effect can be noted from the data on resin solids under the interval of time exposure at 100° C.

Similarly the effect of the humidity conditions during cure on the bulking quality of the disintegrated product in paper pulp can be ascertained from the various data presented.

EXAMPLE V 1080 parts by weight of urea, 3170 parts of 37% U.S.P. formaldehyde (containing 5% methyl alcohol), 90 parts of water, 9 parts of 4 M sodium hydroxide, and 185.4 parts of 24% ammonium hydroxide were placed in a reaction flask of adequate size. To the flask were attached a reflux condenser, a thermometer and a mechanical stirrer. The reaction mixture was heated under agitation to reflux temperature, about 98° C., for 15 minutes and 5.5 parts of 4 M phosphoric acid added. Reflux was continued until the viscosity of a test portion, cooled to 20° C., was about 50 centistokes. The reaction was then stopped by the addition of 22 parts of 10% sodium hydroxide solution. The resulting resin syrup contains about 42% nonvolatile solids.

To 52 parts of the above resin syrup were added 1 part of urea, 5 parts of 34% Teepol 610 (a sodium secondary alkyl sulfate produced by the Shell Chemical Corporation), and 42 parts of water. This diluted resin solution was then converted into a partially hardened foam according to the method of British Patent No. 755,173 (W. Bauer) wherein aeration of the resin solution and subsequent injection of acid catalyst (0.65 M phosphoric acid) assist in the formation of the partially hardened foam.

Samples of foam were collected in wire mesh containers and placed in a circulating-air curing oven having inside dimensions of 3½ ft. x 4 ft. x 12 ft. Air was circulated at a rate of about 1000 c.f.m. while the temperature was maintained at 85° C. and the relative humidity at about 11%. Containers of foam were removed from the oven at hourly intervals, their hard outer crusts removed, and evaluated as in Example I. Results are shown in Table V.

*Table V*

| Cure Time @ 85° and 11% R.H., Hours | Apparent Specific Volume of Paper Containing 30% by Weight of Disintegrated Foam, cc./gm. |
|---|---|
| 0 (uncured) | 2.21 |
| 1 | 2.52 |
| 2 | 2.61 |
| 3 | 2.64 |
| 4 | 2.94 |
| 5 | 2.89 |

All of these handsheets had a slightly harsh handfeel.

It was observed that the blocks of foam prepared in this example had very hard, brittle outer crusts which had to be removed prior to sheet making.

EXAMPLE VI

Urea-formaldehyde was prepared exactly as in Example V with the exception that curing was conducted at a relative humidity of approximately 20%. This humidity was maintained by injecting steam into the oven chamber as required. Results of the experiment are as follows:

*Table VI*

| Cure Time @ 85° and 20% R.H., Hours | Apparent specific Volume of Paper Containing 30% by Weight of Disintegrated Foam, cc./gm. |
|---|---|
| 0 | 2.21 |
| 1 | 2.59 |
| 2 | 2.68 |
| 3 | 2.94 |
| 4 | 3.17 |
| 5 | 3.29 |

These handsheets were softer and more velvet-like in feel than the sheets from Example V.

Blocks of foam prepared in this example had very much softer outer crusts than the foam blocks of Example V.

EXAMPLE VII

Urea-formaldehyde foams were prepared exactly as in Examples V and VI with the exception that curing was conducted at a relative humidity of approximately 42%. This humidity was also maintained by controlled steam injection. Results of this experiment are as follows:

*Table VII*

| Cure Time @ 85° and 42% R.H., Hours | Apparent specific Volume of Paper Containing 30% by Weight of Disintegrated Foam, cc./gm. |
|---|---|
| 0 | 2.21 |
| 1 | 2.59 |
| 2 | 3.05 |
| 3 | 3.26 |
| 4 | 3.55 |
| 5 | 3.80 |

These handsheets were very soft and velvet-like to the touch. There was decided improvement in this respect over both Examples V and VI.

Blocks of foam prepared in this example had virtually no objectionable outer crusts in contrast to Examples V and VI.

From the above data it can be seen that improved urea-formaldehyde resin foams, having a three-dimensional reticulated structure can be secured provided the curing at temperatures of 50–100° C. in the presence of hardening agents is conducted in a humid atmosphere, namely an atmosphere possessing sufficient water vapor content to diminish the tendency of escape of water in vapor form from the uncured resin, and to postpone any drying out effect until the curing has progressed to a considerable extent. Good effects can be achieved over a broad range of humidities, the specific conditions of humidity being selected with relation to the curing temperature employed, the nature of the catalyst and the specific effect desired. For example, when the moderate curing temperature of 50° C. is employed, it is sufficient that the relative humidity generated by the water content of the moist resin under confinement as in Example II creates a desirable atmosphere without further humidity control. On the other hand, good results are secured at a controlled 100% relative humidity when curing temperatures of 100° C. are employed.

As preferred conditions, when curing is effected at temperatures in the range of 50° C. to about 85° C., optimum results are attained with controlled relative humidities of between 10 and 60%. At curing temperatures of 85° C. or higher humidities above about 50% tend to cause a shrinkage of the foam structure, which is an undesirable feature.

In the 85° C. curing range, raising the humidity from 10% to about 50% results in a faster curing rate, a greater bulking capacity in the disintegrated foam, an improved softness in the paper containing the disintegrated foam and a decreased crust formation on the cured blocks.

This invention is particularly directed to the process of making a urea-formaldehyde foamed resin in the form of an undried, cured three-dimensional reticulated structure having a resin solids content of between 18–40%. It is, however, optional to dry the cured product after the curing step has progressed to the stage of reticulation.

A particularly advantageous means of carrying out the curing operation to minimize crust formation through retention of water in the foam by humidity control is accomplished by covering the freshly prepared pre-set but incompletely cured foam with damp, non-adhesive sheet material such as paper, woven or non-woven fabrics during the curing operation, then removing the covering material after the foam is cured. A preferred covering material is the conventional paper makers wet felt. This can be in the form of an endless belt guided through the curing chamber, through showers after leaving the foam, thence to presses, and heated rolls in cylindrical arrangement to carry fresh portions of pre-set foam.

The cured resin foam resulting from the controlled heating in an atmosphere of about 42% relative humidity at 85° C. has a uniform structure composed predominantly of slender, flexible rod-like strands, extending from junctions or nexus in three-dimensions, so as to compose a reticulated network substantially free of membraneous material. The rigidity of the structure has developed sufficiently that under the hydraulic shear of disintegration and deagglomeration there results primarily the multi-axial three-dimensional strand assemblies which provide maximum bulking in the final paper. The residual flexibility of the structural elements of the cured system precludes excessive shattering into uni-axial fragments and heterogeneous debris from the strand junctions.

Incomplete curing of the resin foam, leaving therein a high degree of plasticity, occasions shredding of the foam under disintegrating forces into heterogeneous deformed shapes of diminished bulking capacity. Similarly excessive curing increases the rigidity of the reticulated structure to the extent that it becomes frangible and is susceptible of excessive pulverizing under disintegrating processes.

It is, of course, obvious that the mechanical and physical properties required in the reticulated three-dimensional strand structure which constitute the optimum for bulking capacity upon disintegration and incorporation into pulp stocks for the preparation of paper, are somewhat dependent upon the severity of the disintegration process.

When the normal paper making stock such as wood pulp is to be blended with moist cured aminoplast structures, and the composite is to be co-refined to the higher degrees of cellulosic fibrillation in equipment such as Beaters, Jordans, Hydropulpers, Hollanders, etc., it is obvious that relatively tough, resilient and pliable cured aminoplast structures will be required.

However, when the composite blend of wood pulp and moist cured aminoplast structure is to be co-refined to lesser degrees, or if the refining of the cellulosic component is to be carried out separately prior to blending with the urea-formaldehyde structures, then the curing may be carried out to produce more rigid reticulated structures.

It is further obvious, to those skilled in the art of paper making, in the paper machine systems where large quantities of the paper making fiber passes through the wire and is continuously recirculated as a white water system which is reblended with incoming stock, that a portion of the stock is subjected to a multiplicity of refining processes and generally develops an appreciable amount of fines or debris from fibers. Here, it is desirable to employ those cured aminoplast structures which are less brittle than those which one could use in paper machine systems where the white water system contains lesser proportional amounts of fibers.

What we claim is:

1. The process of making a urea-formaldehyde foamed resin in the form of an undried, cured, three-dimensional reticulated structure which comprises heating at a temperature of from 50–100° C. a thin walled, moist, pre-set and incompletely cured urea-formaldehyde resin foam containing an acid curing catalyst in a moist atmosphere maintained at 10–60% humidity until the walls of such foam have been coalesced into the three-dimensional strands structure.

2. The process of making a urea-formaldehyde foamed resin in the form of an undried, cured, three-dimensional reticulated structure which comprises heating at approximately 85° C. and a relative humidity in the range of 20–50% a thin walled, moist, pres-set and incompletely cured urea-formaldehyde resin foam containing an acid curing catalyst until the walls of such foam have been coalesced into the three-dimensional strands structure.

3. An undried, cured three-dimensional reticulated urea-formaldehyde resin structure comprising from 18 to 40% of resin solids as produced by the process of claim 1.

References Cited in the file of this patent

UNITED STATES PATENTS

| 2,076,295 | Curs et al. | Apr. 6, 1937 |
| 2,493,075 | La Lande et al. | Jan. 3, 1950 |
| 2,789,695 | Lindvig | Apr. 16, 1957 |
| 2,970,120 | Kreidl et al. | Jan. 31, 1961 |

FOREIGN PATENTS

| 1,176,044 | France | Nov. 17, 1958 |